H. LANE.
APPARATUS FOR PRODUCING HYDROGEN GAS.
APPLICATION FILED JULY 16, 1910.
1,028,366.
Patented June 4, 1912.
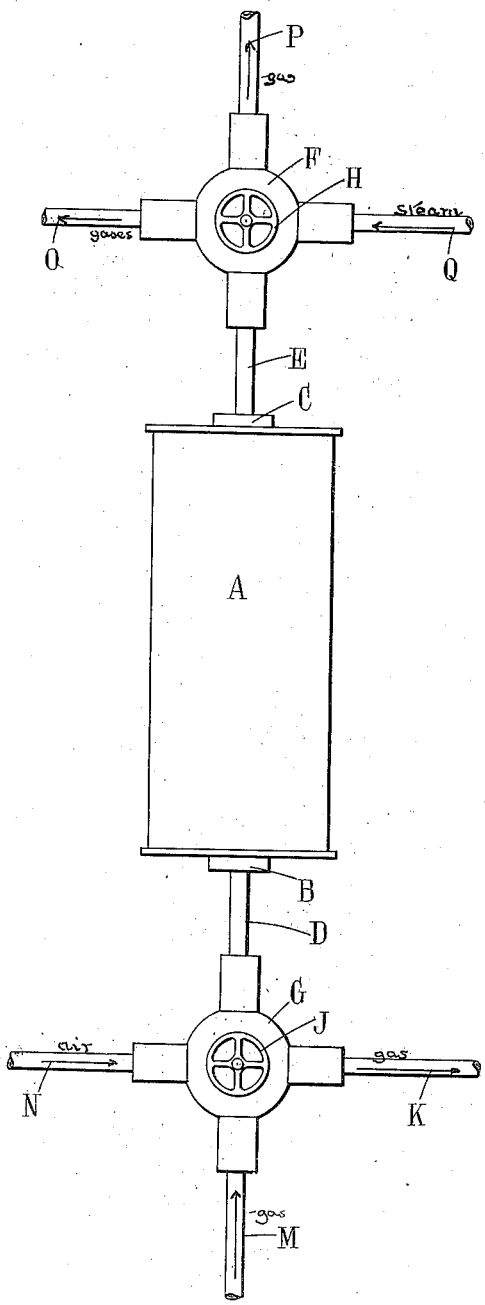
WITNESSES:
G. V. Rasmussen
Louis Alexander
INVENTOR
HOWARD LANE
BY
Boresen & ...
ATTORNEYS

UNITED STATES PATENT OFFICE.

HOWARD LANE, OF BIRMINGHAM, ENGLAND, ASSIGNOR TO INTERNATIONALE WASSERSTOFF AKTIENGESELLSCHAFT, OF FRANKFORT-ON-THE-MAIN, GERMANY.

APPARATUS FOR PRODUCING HYDROGEN GAS.

1,028,366. Specification of Letters Patent. Patented June 4, 1912.

Application filed July 16, 1910. Serial No. 572,411.

*To all whom it may concern:*

Be it known that I, HOWARD LANE, a subject of the King of Great Britain, and resident of 125 Edmund street, Birmingham, in the county of Warwick, England, have invented an Apparatus for Producing Hydrogen Gas, of which the following is a specification.

This invention relates to an apparatus for carrying out the method of producing hydrogen in which a metal is alternately oxidized by steam and deoxidized by a reducing gas. It has been found in practice that the hydrogen gas obtained by such process always contains a relatively large proportion of gaseous and solid bodies (or what may be termed impurities) produced concurrently with the hydrogen and whose presence considerably increases the quantity of reducing gas necessary for carrying out the reduction operation, as well as the time necessary for effecting the deoxidation of the contact material. The presence of these impurities in the hydrogen gas is due to the fact that the reducing agent contains sulfur, carbon and other impurities which either become deposited on the contact material or generate gases such as sulfurous acid, sulfuretted hydrogen, carbon-dioxid, etc. It has been further found that after the reduction phase a certain quantity of free reducing gas still remains in the retort, the presence of which contaminates the hydrogen and consequently lessens its commercial value.

The object of the present invention is to provide the retort wherein the alternate oxidation and reducing phases of the process are effected with means whereby the reducing gas as well as the sulfur, carbon and other impurities associated with said gas may be got rid of between the two phases of the process. To this end the retort is provided at each extremity with a multiple-way controlling valve adapted to establish communication between that end of the retort and any one of three pipes connected respectively at the one end of the retort to a supply of air under pressure, a supply of reducing gas, and a hydrogen receiver, and at the opposite end of the retort respectively to an outlet, a gas-washing and regenerating apparatus, and a supply of steam under pressure.

The invention will be described with reference to the accompanying drawing which shows schematically a retort provided with the controlling valves referred to.

A is the retort provided with an inlet B at the lower end and an outlet C at the upper end, and F and G are four-way valves which are capable of being rotated by means of hand-wheels H and J so as to open communication on the one hand between the retort A and either the pipe K connected to a hydrogen container, a pipe M connected to a supply of reducing gas, or a pipe N connected to a supply of air under pressure, and on the other hand either with a discharge pipe O, a pipe P leading to a gas washing or regenerating apparatus and a pipe Q connected to a supply of low pressure steam.

Assuming that the contact material in the retort has been oxidized during the previous hydrogen-producing phase, the sequence of operations is as follows. In the first place the impurities deposited on the contact material during the previous reduction phase, or present in the gaseous state in the retort, are removed by effecting their combustion. This is effected by rotating the valve G one quarter of a revolution so as to admit air under pressure to the lower part of the retort through the pipes N and D, and rotating valve F so as to force out the products of combustion into the atmosphere through the pipes E and O. The valve G is then rotated so as to admit reducing gas to the retort through pipes M and D and rotating valve F so as to open communication between the upper part of the retort and the gas washing or regenerating apparatus through pipes E and P. At the completion of the reducing phase the valve F is rotated so as to connect the upper part of the retort with the supply of steam under pressure through pipes Q and E, whereupon the pressure of the steam being greater than that of the reducing gas remaining in the retort, the latter is forced out through pipes D and M carrying with it the impure hydrogen which has been generated by the action of the steam on the sulfur, carbon, etc., deposited on the contact material. As soon as it is found that the hydrogen passing out through pipe M is sufficiently pure the valve G is rotated so as to deliver the gas to the hydrogen container after which process air is then again passed through the retort in the manner previously described.

Claims:

1. The combination with a retort wherein hydrogen gas may be generated by the alternate oxidation and deoxidation of a metal in the manner described, of a pair of valves both in permanent communication with the retort and respectively adapted to be put into communication at one end with a container for the hydrogen gas generated, a supply of reducing gas, and a supply of air under pressure, and at the other end with a supply of steam under pressure, a gas washing and regenerating apparatus and a discharge outlet, substantially as set forth.

2. The combination of a retort wherein hydrogen gas may be generated by the alternate oxidation and deoxidation of a metal, conduits for conducting air and reducing gas thereinto and hydrogen therefrom, a valve for controlling said conduits, other conduits for conducting steam into said retort and reaction products from said retort, and a valve for controlling said last mentioned conduits.

3. The combination of a retort wherein hydrogen may be generated by the alternate oxidation and deoxidation of a metal, a main conduit at each end thereof, three branch conduits leading to each main conduit, and a three-way valve at each intersection of branch conduits and a main conduit, said valves being adapted to control the communication of the branch conduits with the main conduits.

HOWARD LANE.

Witnesses:
    NORMAN S. BARLOW,
    FRANK V. NEALE.